US010012130B2

(12) United States Patent
Hoshi et al.

(10) Patent No.: US 10,012,130 B2
(45) Date of Patent: Jul. 3, 2018

(54) COOLING SYSTEM

(71) Applicant: HONDA MOTOR CO., LTD., Tokyo (JP)

(72) Inventors: Konomu Hoshi, Wako (JP); Hisashi Matsuo, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 15/212,652

(22) Filed: Jul. 18, 2016

(65) Prior Publication Data

US 2017/0022876 A1  Jan. 26, 2017

(30) Foreign Application Priority Data

Jul. 23, 2015  (JP) ................. 2015-146151

(51) Int. Cl.
| | |
|---|---|
| *B60K 11/02* | (2006.01) |
| *F01P 5/06* | (2006.01) |
| *F01P 11/10* | (2006.01) |
| *B60K 11/04* | (2006.01) |
| *F01P 3/18* | (2006.01) |
| *F01P 5/04* | (2006.01) |

(52) U.S. Cl.
CPC ............ *F01P 5/06* (2013.01); *B60K 11/02* (2013.01); *B60K 11/04* (2013.01); *F01P 3/18* (2013.01); *F01P 5/04* (2013.01); *F01P 11/10* (2013.01)

(58) Field of Classification Search
CPC ........ F01P 5/06; F01P 5/04; F01P 3/18; F01P 11/10; B60K 11/04; B60K 11/02
See application file for complete search history.

(56) References Cited

U.S. PATENT DOCUMENTS

| | | | | | |
|---|---|---|---|---|---|
| 2,260,594 | A | * | 10/1941 | Young | ..................... F28D 1/024 165/125 |
| 3,692,004 | A | * | 9/1972 | Tangue | ..................... F01P 5/06 123/41.49 |
| 3,777,808 | A | * | 12/1973 | Izumi | ..................... B60K 11/02 165/271 |
| 3,800,866 | A | * | 4/1974 | Ireland | .................. F28D 1/0358 165/122 |
| 3,829,236 | A | * | 8/1974 | MacLennan | .............. F01P 7/02 277/409 |
| 4,184,541 | A | * | 1/1980 | Beck | ........................ F01P 5/06 123/41.49 |

(Continued)

FOREIGN PATENT DOCUMENTS

| | | | |
|---|---|---|---|
| EP | 995895 A2 | * | 4/2000 |
| JP | S5029936 A | | 3/1975 |

(Continued)

*Primary Examiner* — Jacob B Meyer
(74) *Attorney, Agent, or Firm* — Squire Patton Boggs (US) LLP

(57) ABSTRACT

A cooling system includes a rear radiator that is mounted in a vehicle and circulates cooling water to release heat of the cooling water. A fan that generates cooling air to cool the rear radiator, and a shroud is provided between the fan and the rear radiator and guides the cooling air. The shroud has a double structure having an internal space; the internal space enables the cooling water to pass through the internal space when the cooling water circulates.

14 Claims, 8 Drawing Sheets

(56) References Cited

U.S. PATENT DOCUMENTS

| | | | | |
|---|---|---|---|---|
| 4,397,348 | A * | 8/1983 | Klem | F28D 1/02 123/41.49 |
| 4,909,311 | A * | 3/1990 | Nakamura | B60K 11/04 123/41.49 |
| 4,947,931 | A * | 8/1990 | Vitacco | F25B 39/04 165/135 |
| 5,012,768 | A * | 5/1991 | Roschinski | F01P 5/06 123/41.14 |
| 5,046,554 | A * | 9/1991 | Iwasaki | B60K 11/04 123/41.49 |
| 5,129,473 | A * | 7/1992 | Boyer | B60K 11/02 180/68.1 |
| 5,216,983 | A * | 6/1993 | Nilson | F01P 7/044 123/41.12 |
| 5,519,269 | A * | 5/1996 | Lindberg | H02K 9/19 310/58 |
| 5,649,587 | A * | 7/1997 | Plant | F01P 5/06 123/41.49 |
| 5,660,149 | A * | 8/1997 | Lakerdas | F01P 5/06 123/41.01 |
| 5,960,748 | A * | 10/1999 | Lewis | F01P 7/044 123/41.12 |
| 5,971,062 | A * | 10/1999 | Sadr | B60K 11/04 123/41.54 |
| 6,016,774 | A * | 1/2000 | Bokkers | F01P 5/06 123/41.1 |
| 6,041,744 | A * | 3/2000 | Oota | F01P 5/06 123/41.14 |
| 6,189,492 | B1 * | 2/2001 | Brown | B60S 1/50 123/41.49 |
| 6,499,956 | B2 * | 12/2002 | Nakamura | F04D 29/545 181/224 |
| 6,676,371 | B1 * | 1/2004 | Brown | F04D 29/023 123/41.49 |
| 6,732,681 | B1 * | 5/2004 | Hendricks, Sr. | F01P 3/18 123/41.49 |
| 6,832,643 | B1 * | 12/2004 | Zobel | F28F 9/02 123/41.49 |
| 6,896,095 | B2 * | 5/2005 | Shah | F01P 5/06 181/198 |
| 6,908,283 | B2 * | 6/2005 | Soofer | F01P 11/029 415/215.1 |
| 6,910,529 | B2 * | 6/2005 | Stone | B60K 11/04 123/142.5 R |
| 6,938,727 | B2 * | 9/2005 | Xia | B60K 11/04 181/213 |
| 7,017,707 | B2 * | 3/2006 | Zia | F01N 1/02 181/250 |
| 7,047,914 | B2 * | 5/2006 | Komorowski | F01L 1/02 123/41.47 |
| 7,404,463 | B2 * | 7/2008 | Saiki | B62K 19/30 180/229 |
| 8,141,670 | B2 * | 3/2012 | Hayashi | B60K 11/04 180/68.4 |
| 8,182,217 | B2 * | 5/2012 | Schaffer | F01P 5/06 415/214.1 |
| 8,256,551 | B2 * | 9/2012 | Entriken | F01P 1/06 123/41.49 |
| 8,454,718 | B2 * | 6/2013 | Buchmann | F01P 11/12 55/385.3 |
| 8,763,409 | B2 * | 7/2014 | Newman | F28D 15/0275 62/239 |
| 8,807,113 | B2 * | 8/2014 | Cassell, Jr. | F02M 35/161 123/198 E |
| 8,936,121 | B2 * | 1/2015 | Vacca | B60K 11/04 165/44 |
| 8,991,534 | B2 * | 3/2015 | Morey | B60K 11/06 180/68.1 |
| 9,487,076 | B2 * | 11/2016 | Matsuo | B60K 11/04 |
| 9,751,393 | B2 * | 9/2017 | Nakata | B60K 11/04 |
| 2001/0018022 | A1 * | 8/2001 | Nakamura | F04D 29/545 415/203 |
| 2003/0029393 | A1 * | 2/2003 | Komorowski | F01L 1/02 123/41.44 |
| 2003/0183446 | A1 * | 10/2003 | Shah | F01P 5/06 181/205 |
| 2003/0221905 | A1 * | 12/2003 | Xia | B60K 11/04 181/224 |
| 2004/0012125 | A1 * | 1/2004 | Plant | B60K 11/08 264/523 |
| 2004/0129407 | A1 * | 7/2004 | Stone | B60K 11/04 165/41 |
| 2005/0079051 | A1 * | 4/2005 | Soofer | F01P 11/029 415/215.1 |
| 2006/0048924 | A1 * | 3/2006 | Desai | F01P 11/029 165/148 |
| 2006/0065455 | A1 * | 3/2006 | Saiki | B62K 11/04 180/68.4 |
| 2008/0066696 | A1 * | 3/2008 | Hirayama | F01P 3/04 123/41.44 |
| 2008/0066698 | A1 * | 3/2008 | Hirayama | B62J 15/00 123/41.62 |
| 2008/0236518 | A1 * | 10/2008 | Schaffer | F01P 5/06 123/41.49 |
| 2010/0242866 | A1 * | 9/2010 | Buchmann | F01P 11/12 123/41.49 |
| 2010/0247351 | A1 * | 9/2010 | Kleber | F04D 29/164 417/410.1 |
| 2011/0155081 | A1 * | 6/2011 | Entriken | F01P 1/06 123/41.49 |
| 2011/0240252 | A1 * | 10/2011 | Borski | F28F 9/002 165/51 |
| 2012/0241128 | A1 * | 9/2012 | Vacca | B60K 11/04 165/44 |
| 2013/0008631 | A1 * | 1/2013 | Newman | F28D 15/0275 165/104.26 |
| 2014/0182956 | A1 * | 7/2014 | Morey | B60K 11/06 180/68.1 |
| 2015/0068830 | A1 * | 3/2015 | Nakata | B60K 11/04 180/229 |
| 2015/0328979 | A1 * | 11/2015 | Matsuo | B62J 17/00 180/229 |
| 2016/0177810 | A1 * | 6/2016 | Gullberg | F04D 17/16 415/119 |
| 2016/0208674 | A1 * | 7/2016 | Kim | F04D 29/326 |
| 2017/0022876 | A1 * | 1/2017 | Hoshi | B60K 11/04 |

FOREIGN PATENT DOCUMENTS

| | | | |
|---|---|---|---|
| JP | S51116602 | * | 1/1978 |
| JP | S5333738 U | | 3/1978 |
| JP | S50029936 | * | 1/1980 |
| JP | 2009241901 A | | 10/2009 |
| JP | 2011-073537 A | | 4/2011 |
| JP | 02012241570 A | * | 12/2012 |
| JP | 2012241570 A | | 12/2012 |
| JP | 2013173473 A | | 9/2013 |
| KR | 2001019244 | * | 3/2001 |
| KR | 2013126202 | * | 11/2013 |

* cited by examiner

COOLING SYSTEM

BACKGROUND

Field

The present invention relates to a cooling system.

Description of the Related Art

Conventionally, in cooling systems for vehicles, there is one disclosed in Patent Document 1 (Japanese Patent Laid-Open No. 2011-073537) for example. This includes a radiator, a grill that leads cooling air to cooling fins of the radiator, a fan that is provided on the rear side of the radiator and draws the cooling air, and a shroud that is provided between the radiator and the fan and forms a path of the cooling air.

SUMMARY

However, although the shroud of Patent Document 1 has an air guiding function of cooling air, the amount of heat generation of the engine increases for example, when the size of the engine of the vehicle is increased, and therefore heat of a cooling medium for cooling the engine cannot always be sufficiently released with only the radiator.

On the other hand, it will also be possible to increase the size of the radiator in order to improve the cooling performance of the cooling medium. However, it is often difficult to mount a large radiator because of the layout of the vehicle.

Therefore, improving the cooling performance of the cooling medium is desired.

The present invention intends to improve the cooling performance of a cooling medium in a cooling system including a radiator mounted in a vehicle, a fan that generates cooling air to cool the radiator, and a shroud that is provided between the fan and the radiator and guides the cooling air.

As a solution to the above-described problems, an embodiment invention provides a cooling system including a radiator that is mounted in a vehicle and circulates a cooling medium to release heat of the cooling medium. A fan generates cooling air to cool the radiator, and a shroud is provided between the fan and the radiator and guides the cooling air. In the cooling system, the shroud has a double structure having an internal space which allows the cooling medium to pass through the internal space when the cooling medium circulates.

In another embodiment, the shroud includes, as the double structure, an inner portion having a tubular shape and an outer portion that is provided outside the inner portion in the radial direction and has a tubular shape. The internal space is formed between the inner portion and the outer portion.

Another embodiment includes partition wall parts that divide the internal space into a first internal space through which the cooling medium is caused to pass and a second internal space through which the cooling medium that has passed through the first internal space is caused to pass.

In another embodiment, the partition wall parts divide the internal space into upper and lower spaces, and the second internal space is disposed under the first internal space.

In another embodiment, the invention is configured to cause the cooling medium to flow in order of the first internal space, the radiator, and the second internal space.

In another embodiment, a radiating fin that releases the heat of the cooling medium is provided on a surface facing an air guiding space to which the cooling air is guided in the shroud.

In yet another embodiment, the radiator is mounted in a saddle-type vehicle and a second radiator that circulates the cooling medium common with the radiator is provided at a front part of the saddle-type vehicle.

In another embodiment, the fan is disposed on the upstream side relative to the radiator in the flow direction of the cooling air.

According to some embodiments, the shroud has the double structure having the internal space and the internal space allows the cooling medium to pass through the internal space when the cooling medium circulates. This allows the cooling medium passing through the internal space to be cooled by the cooling air at the surface of the shroud. Therefore, the shroud can be allowed to have a cooling function and the cooling performance of the cooling medium can be improved.

In other embodiments, the internal space is formed between the inner portion and the outer portion. This allows the cooling medium passing through the internal space to be cooled by the cooling air at the surface facing the air guiding space in the inner portion (inner side surface in the radial direction) or the surface facing the air guiding space in the outer portion (outer side surface in the radial direction). Therefore, with the simple structure including the inner portion and the outer portion as the double structure, the shroud can be allowed to have the cooling function and the cooling performance of the cooling medium can be improved.

Certain embodiments are such that the shroud includes the partition wall parts that divide the internal space into the first internal space through which the cooling medium is caused to pass and the second internal space through which the cooling medium that has passed through the first internal space is caused to pass. Due to this, the cooling medium passing through the first internal space can be cooled by the cooling air at the surface of the part forming the first internal space of the shroud. In addition, the cooling medium that has passed through the first internal space can be further cooled by the cooling air at the surface of the part forming the second internal space of the shroud. Therefore, the cooling medium can be cooled at two stages and the cooling performance of the cooling medium can be further improved.

In some embodiments, the partition wall parts divide the internal space into upper and lower spaces and the second internal space is disposed under the first internal space. This allows the cooling medium to flow from the first internal space to the second internal space by utilizing the gravitational force. Thus, the cooling medium can be caused to efficiently flow from the first internal space toward the second internal space.

Some embodiments are such that the cooling system is configured to cause the cooling medium to flow in order of the first internal space, the radiator, and the second internal space. Due to this, the cooling medium passing through the first internal space can be cooled by the cooling air at the surface of the part forming the first internal space of the shroud. In addition, the cooling medium that has passed through the first internal space can be further cooled by circulating the cooling medium by the radiator. Then, the cooling medium that has circulated in the radiator can be further cooled by the cooling air at the surface of the part forming the second internal space of the shroud. Therefore, the cooling medium can be cooled at three stages and the cooling performance of the cooling medium can be further improved.

In certain embodiments, the radiating fin that releases heat of the cooling medium is provided on the surface facing the air guiding space to which the cooling air is guided in the shroud. This increases the surface area of the surface facing the air guiding space in the shroud and thus can improve the heat release effect of the cooling medium.

In some embodiments, the radiator is mounted in the saddle-type vehicle and the second radiator that circulates the cooling medium common with the radiator is provided at the vehicle front part. This can reduce the size of the second radiator compared with the case in which only one radiator is provided. Thus, it becomes easy to make the vehicle front part compact, which allows improvement in the appearance.

In embodiments where the fan is disposed on the upstream side relative to the radiator in the flow of the cooling air, this allows the cooling medium passing through the internal space to be cooled by the cooling air before passing through the radiator (before being warmed due to the passing through the radiator). Thus, the cooling performance of the cooling medium can be further improved.

DETAILED DESCRIPTION

Figure 1:
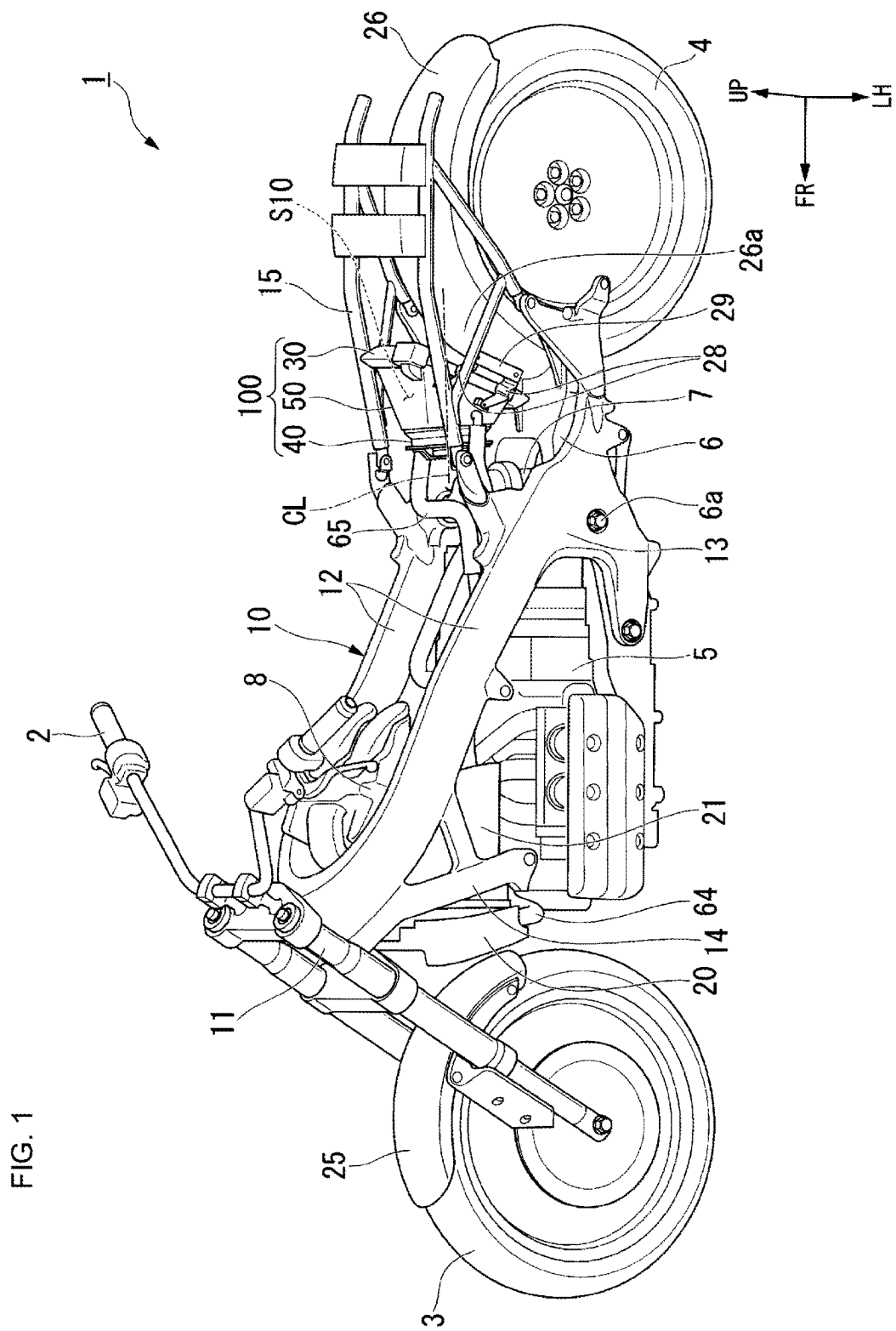
FIG. 1 is a perspective view when a motorcycle in an embodiment of the present invention is viewed from the upper left side.

Embodiments of the present invention will be described below with reference to the drawings. Directions such as the front, rear, left, and right directions in the following description are the same as directions in a vehicle to be described below unless otherwise noted. Furthermore, at appropriate positions in the drawings used for the following description, an arrow FR indicating the vehicle front side, an arrow LH indicating the vehicle left side, and an arrow UP indicating the vehicle upper side are shown.

FIG. 1 shows a motorcycle 1 equipped with a cooling system 100 according to an example of a saddle-type vehicle. In FIG. 1, diagrammatic representation of a fuel tank, a seat, a cowl, and so forth is omitted in order to allow the cooling system 100 to be easily seen.

Referring to FIG. 1, the motorcycle 1 includes a bar handle 2, a front wheel 3 steered by the bar handle 2, and a rear wheel 4 driven by a power unit 5 including an engine. Hereinafter, the motorcycle 1 will be referred to simply as the "vehicle."

Steering-system parts including the bar handle 2 and the front wheel 3 are pivotally supported steerably by a head pipe 11 at the front end of a vehicle body frame 10. The power unit 5 is disposed at the central part of the vehicle body frame 10 in the front-rear direction. At the rear part of the power unit 5, a swingarm 6 is pivotally supported swingably in the upward-downward direction around a pivot shaft 6a. A cushion unit 7 is set between the front part of the swingarm 6 and the rear part of the vehicle body frame 10.

In this example, the vehicle body frame 10 is formed by joining plural kinds of steel materials into a monolithic body by welding or the like. The vehicle body frame 10 includes the head pipe 11, a pair of left and right main frames 12 extending from the head pipe 11 toward the lower rear side, and a pair of left and right pivot plates 13 that are connected to the rear end parts of the pair of left and right main frames 12 and extend downward. A pair of left and right sub-frames 14 extend from the head pipe 11 and the front parts of the pair of left and right main frames 12 in such a manner that a part closer to the lower side is located closer to the rear side (in such a manner that a part closer to the lower side has a larger separation distance from the main frame 12). A pair of left and right seat frames 15 are connected to the upper parts of the pair of left and right pivot plates 13 and extend toward the upper rear side.

The power unit 5 is attached to the pair of left and right pivot plates 13 and the pair of left and right sub-frames 14. An air cleaner box 8 that cleans intake air of a throttle body (not shown) is provided above the power unit 5 and between the pair of left and right main frames 12 in the vehicle width direction.

A front radiator 20 (second radiator) that circulates cooling water (cooling medium) for cooling the engine and releases heat of the cooling water is provided on the front side of the pair of left and right sub-frames 14 (vehicle front part). A front fan (not shown) that draws cooling air to cool the front radiator 20 is provided on the rear side of the front radiator 20. A front shroud 21 that forms an intake path of the cooling air from the front fan is provided between the front radiator 20 and the front fan and between the pair of left and right sub-frames 14 in the vehicle width direction. The front radiator 20 circulates the cooling water common with a rear radiator 30 to be described later. For example, a Long Life Coolant (LLC) is used as the cooling water.

In FIG. 1, numeral 25 denotes a front fender and numeral 26 denotes a rear fender.

The cooling system 100 is provided between the front part of the rear fender 26 and the cushion unit 7 and above the swingarm 6 and between the pair of left and right seat frames 15 in the vehicle width direction (vehicle rear part). The cooling system 100 is attached to the vehicle body frame 10 with the intermediary of brackets 28, support members 29, and so forth.

Figure 2:
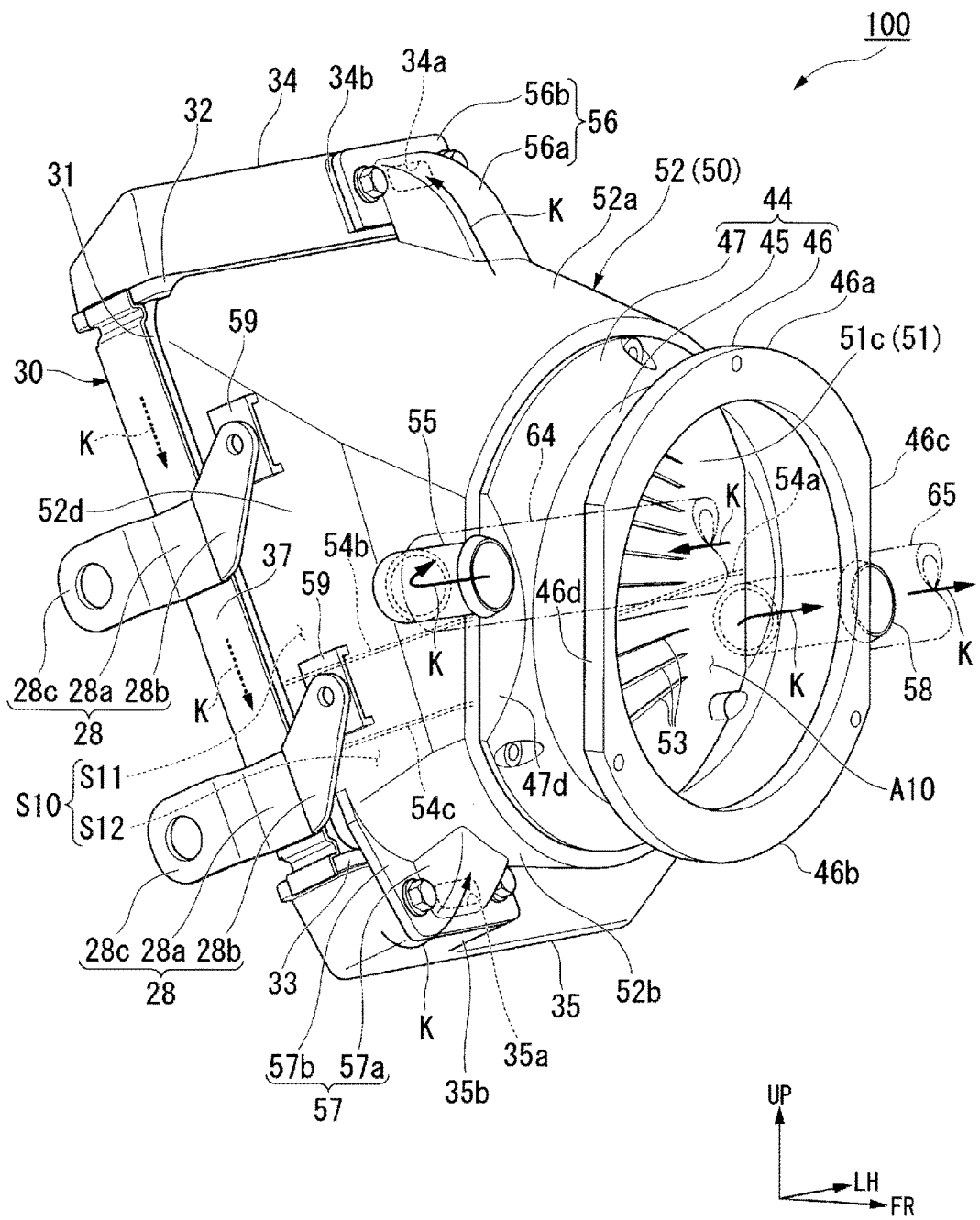
FIG. 2 is a perspective view when a cooling system of the motorcycle is viewed from the front right side.
Figure 3:
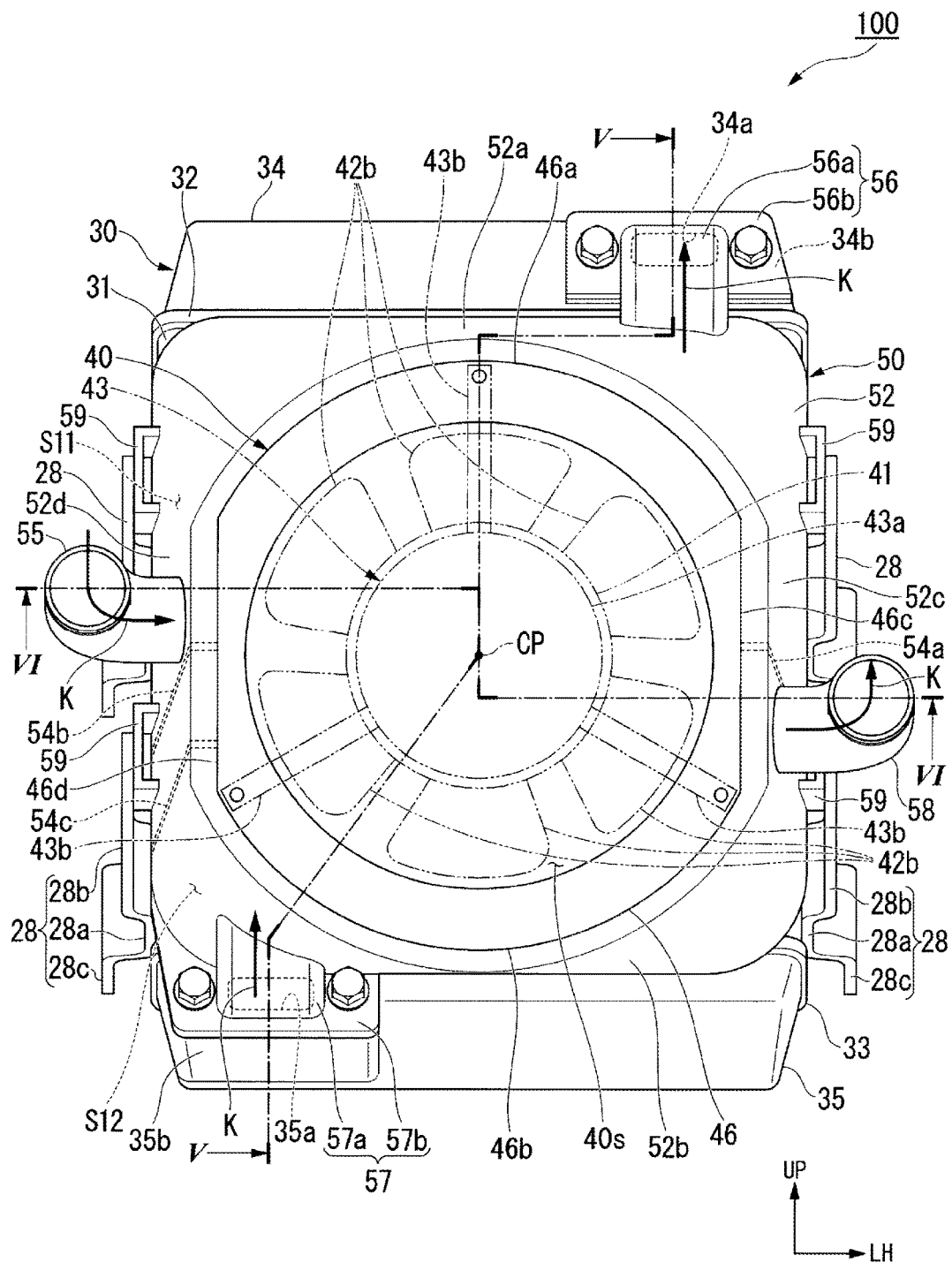
FIG. 3 is a diagram when the cooling system is viewed from the front side along the axis line direction of a fan.
Figure 4:
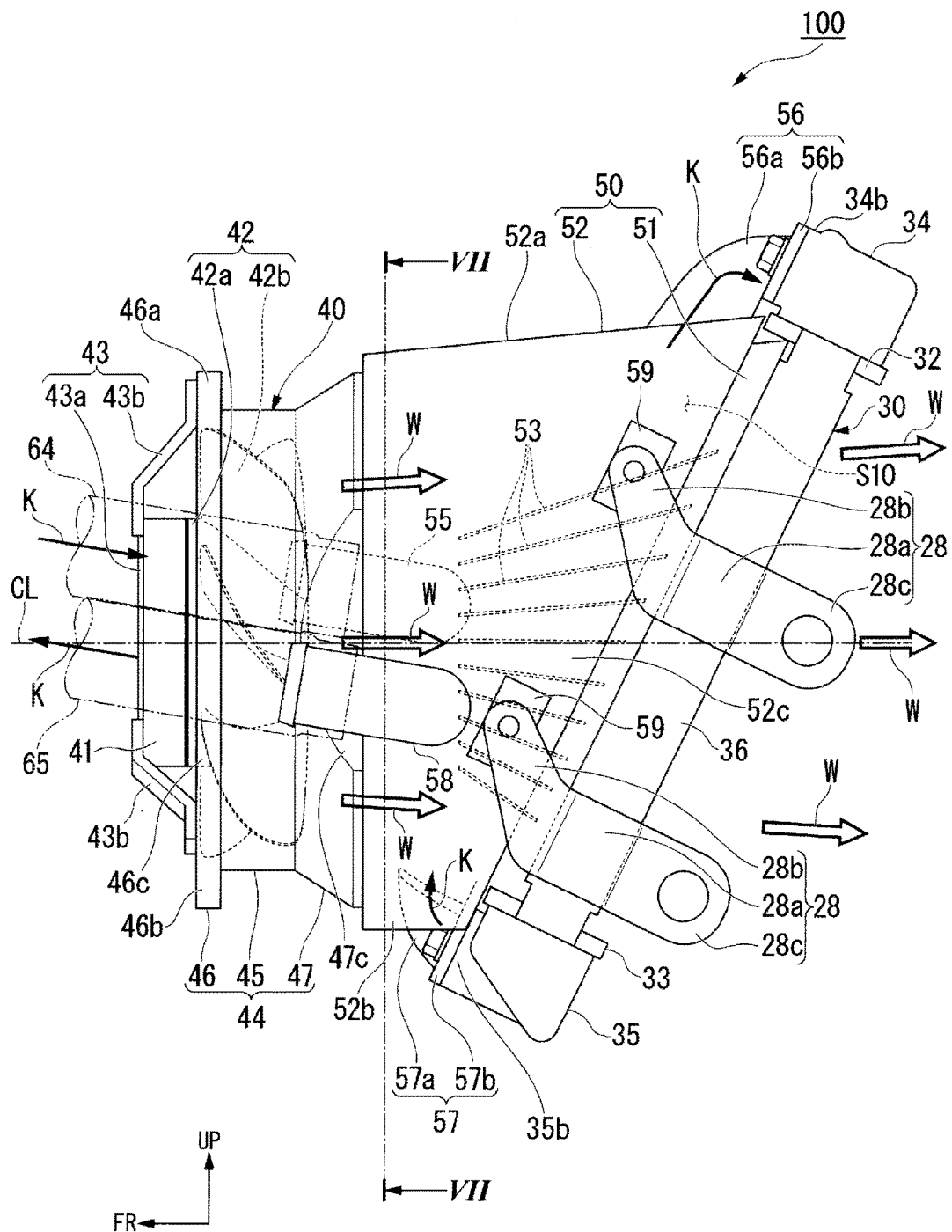
FIG. 4 is a left side view of the cooling system.

Referring to FIGS. 2 to 4 in combination, the cooling system 100 includes the rear radiator 30 that circulates the cooling water and releases heat of the cooling water, an axial fan (hereinafter, referred to simply as the "fan") 40 that generates cooling air to cool the rear radiator 30, and a shroud 50 that is provided between the fan 40 and the rear radiator 30 and guides the cooling air from the fan 40.

Symbol CP in the diagrams denotes the center of the fan 40 as viewed along the axial direction. Furthermore, symbol CL in the diagrams denotes the rotation axis line of the fan 40. Hereinafter, the rotation axis line CL will be referred to simply as the "axis line" and the direction along the axis line CL will be referred to as the "axis line direction." In addition, the direction orthogonal to the axis line CL will be referred to as the "radial direction" and the direction of revolving around the axis line CL will be referred to as the "circumferential direction." The axis line CL is equivalent to the rotation axis line of a motor 41 configuring the fan 40.

Furthermore, arrows W in the diagrams denote the flow of the cooling air and arrows K denote the flow of the cooling water.

The fan 40 is so disposed that the axis line CL is along the vehicle front-rear direction. In the flow direction of the cooling air, the fan 40 is disposed on the upstream side relative to the rear radiator 30. The fan 40 is disposed on the front side of the rear radiator 30 and is configured to send the cooling air toward the rear radiator 30. In side view of FIG. 4, the fan 40 generates the cooling air rearward along the axis line direction. The cooling air sent toward the rear radiator 30 passes through the core of the rear radiator 30 (for example, between tubes and between fins configuring the core) and flows rearward.

The fan 40 includes the motor 41 that forms the axis line CL and a propeller 42 that rotates on the basis of driving of the motor 41.

The propeller 42 has a hub 42a that is fixed to a shaft part of the motor 41 and has a cylindrical shape, plural (for example, six, in the present embodiment) blades 42b provided to be lined in the circumferential direction on the outer circumferential part of the hub 42a, a casing 44 that forms a ring-shaped flow path 40s between the hub 42a and the casing 44, and a fixing member 43 that fixes the motor 41 and the casing 44.

In FIG. 2, diagrammatical representation of the propeller 42 and the fixing member 43 is omitted for convenience.

As viewed along the axis line direction of FIG. 3, the plural (for example, six, in the present embodiment) blades 42b are disposed in the ring-shaped flow path 40s having a circular ring shape. As viewed along the axis line direction of FIG. 3, the respective blades 42b are disposed at predetermined intervals in the circumferential direction (for example, intervals of approximately 60° around the center CP, in the present embodiment).

Referring to FIGS. 3 and 4 in combination, the fixing member 43 includes a fixing portion main body 43a that has a circular disc shape and is fixed to the front end part of the motor 41, and plural (for example, three, in the present embodiment) leg portions 43b that extend outward in the radial direction from the outer circumferential part of the fixing portion main body 43a and join the fixing portion main body 43a and a flange portion 46 of the casing 44.

As viewed along the axis line direction of FIG. 3, the respective leg portions 43b are disposed at predetermined intervals in the circumferential direction (for example, intervals of approximately 120° around the center CP, in the present embodiment).

In side view of FIG. 4, each leg portion 43b extends outward in the radial direction from the outer circumferential part of the fixing portion main body 43a and then extends with an inclination in such a manner as to be located closer to the rear side when extending more outward in the radial direction. Then, each leg portion 43b bends and extends toward the outside in the radial direction to reach the flange portion 46 of the casing 44. The outer end part of each leg portion 43b in the radial direction is fastened and fixed to the flange portion 46 by a fastening member such as a bolt.

The casing 44 includes a casing main body 45 that forms the ring-shaped flow path 40s between the hub 42a and the casing 44 and has a cylindrical shape, the flange portion 46 that protrudes outward in the radial direction from the front end part of the casing main body 45, and a joining wall 47 that extends from the rear end part of the casing main body 45 in such a manner that the diameter of a part closer to the rear side increases more outward in the radial direction, and joins the rear end part of the casing main body 45 and the front end part of the shroud 50.

As viewed along the axis line direction of FIG. 3, the flange portion 46 includes upper and lower outer circumferential parts 46a and 46b that have a circular arc shape concentric with the center CP of the fan 40 and left and right outer circumferential parts 46c and 46d that each have an outer end surface extending in a straight line manner in the upward-downward direction and join the left and right end parts, respectively, of the upper and lower outer circumferential parts 46a and 46b.

In side view of FIG. 4, at the left and right side parts of the joining wall 47, left and right flat parts 47c and 47d (see FIG. 2 regarding the right flat part 47d) extending in a straight line manner in the upward-downward direction along the left and right outer circumferential parts 46c and 46d of the flange portion 46 are formed.

Referring to FIGS. 2 to 4 in combination, the rear radiator 30 has a rectangular parallelepiped shape and is disposed opposed to a front inclined part 26a (see FIG. 1) of the rear fender 26 in such a manner that the short sides are along the vehicle width direction and the long sides are inclined with respect to the axis line CL (specifically, inclined rearward with respect to the vehicle upward-downward direction).

The rear radiator 30 includes a core 31 having a rectangular parallelepiped shape, upper and lower plates 32 and 33 provided at both upper and lower ends of the core 31, an upper tank 34 joined to the upper plate 32, a lower tank 35 joined to the lower plate 33, and left and right plates 36 and 37 provided at both left and right ends of the core 31.

The rear radiator 30 disperses and releases, in the core 31, heat of the cooling water sent by a water pump of the engine from a water jacket of the engine (neither is shown) via the front radiator 20 (see FIG. 1) and so forth for example. As the rear radiator 30, a so-called down-flow type that causes the cooling water that has passed through a first internal space S11 of the shroud 50 to be described later to flow downward is used.

The core 31 is so disposed that the short sides are along the vehicle width direction and the long sides are inclined with respect to the axis line CL (specifically, inclined rearward with respect to the vehicle upward-downward direction).

The upper and lower plates 32 and 33 extend in the vehicle width direction along the short sides of the core 31 and fix tubes and fins (neither is shown) configuring the core 31. The upper plate 32 joins the upper end part of the core 31 and the upper tank 34. The lower plate 33 joins the lower end part of the core 31 and the lower tank 35.

The upper tank 34 and the lower tank 35 extend in the vehicle width direction along the upper and lower plates 32 and 33, respectively.

The left and right plates 36 and 37 each extend along the longer sides of the core 31, and join the upper tank 34 and the lower tank 35 and join the upper plate 32 and the lower plate 33.

The upper tank 34 temporarily reserves the cooling water that has passed through the first internal space S11 to be described later and guides the reserved cooling water to the core 31. An inlet part 34a that causes the cooling water from the first internal space S11 to flow into the upper tank 34 is formed at the left end part of the front side of the upper tank 34. A water filling port (filler neck, not shown) may be made in the upper tank 34.

The lower tank 35 collects the cooling water that has passed through the tubes configuring the core 31 and causes the cooling water to flow out to a second internal space S12 to be described later. An outlet part 35a that causes the cooling water from the tubes to flow out to the second internal space S12 is formed at the right end part of the front side of the lower tank 35. A drain cock (not shown) may be made in the lower tank 35.

Figure 5:
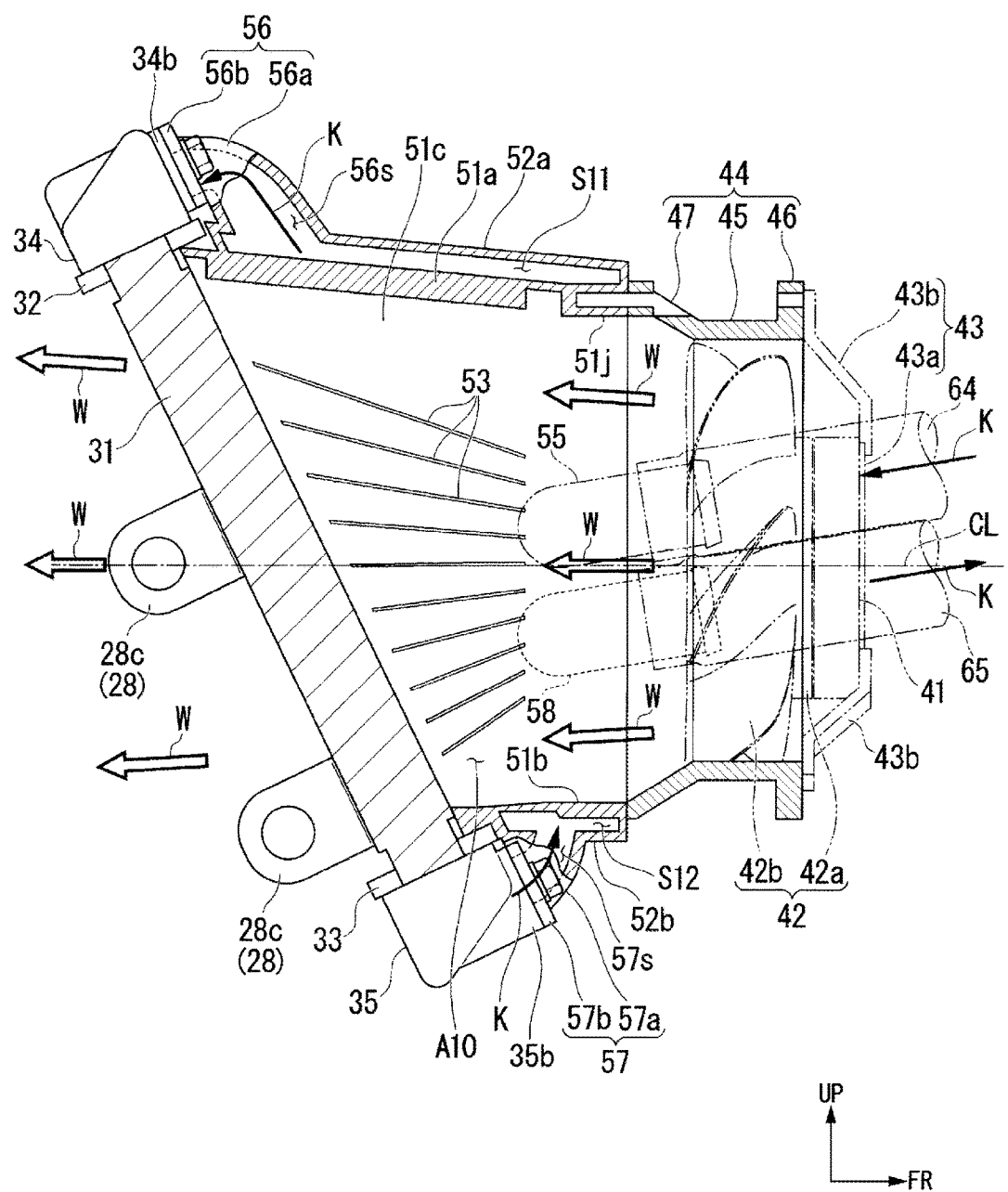
FIG. 5 is a diagram including a section along line V-V in FIG. 3.
Figure 6:
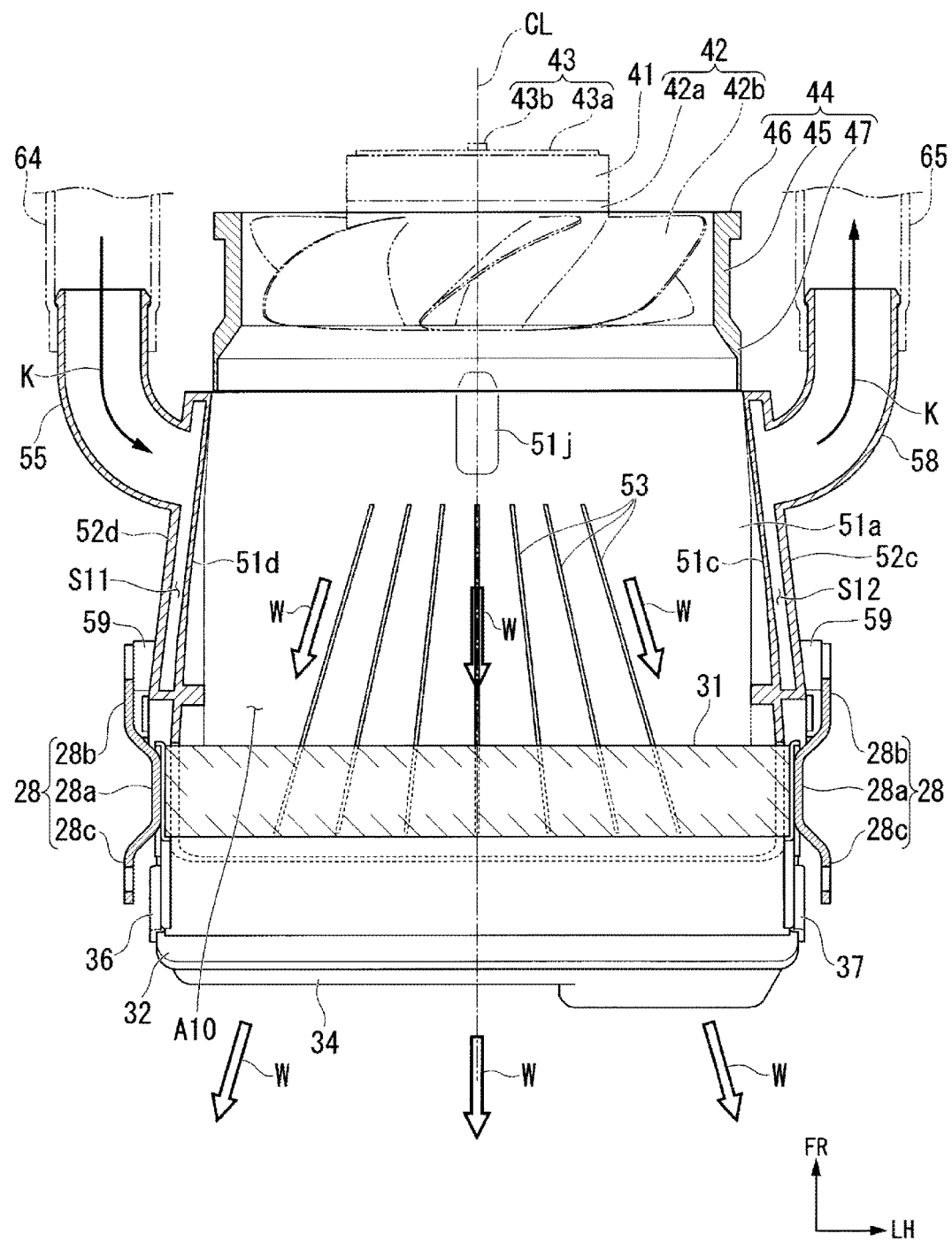
FIG. 6 is a diagram including a section along line VI-VI in FIG. 3.
Figure 7:
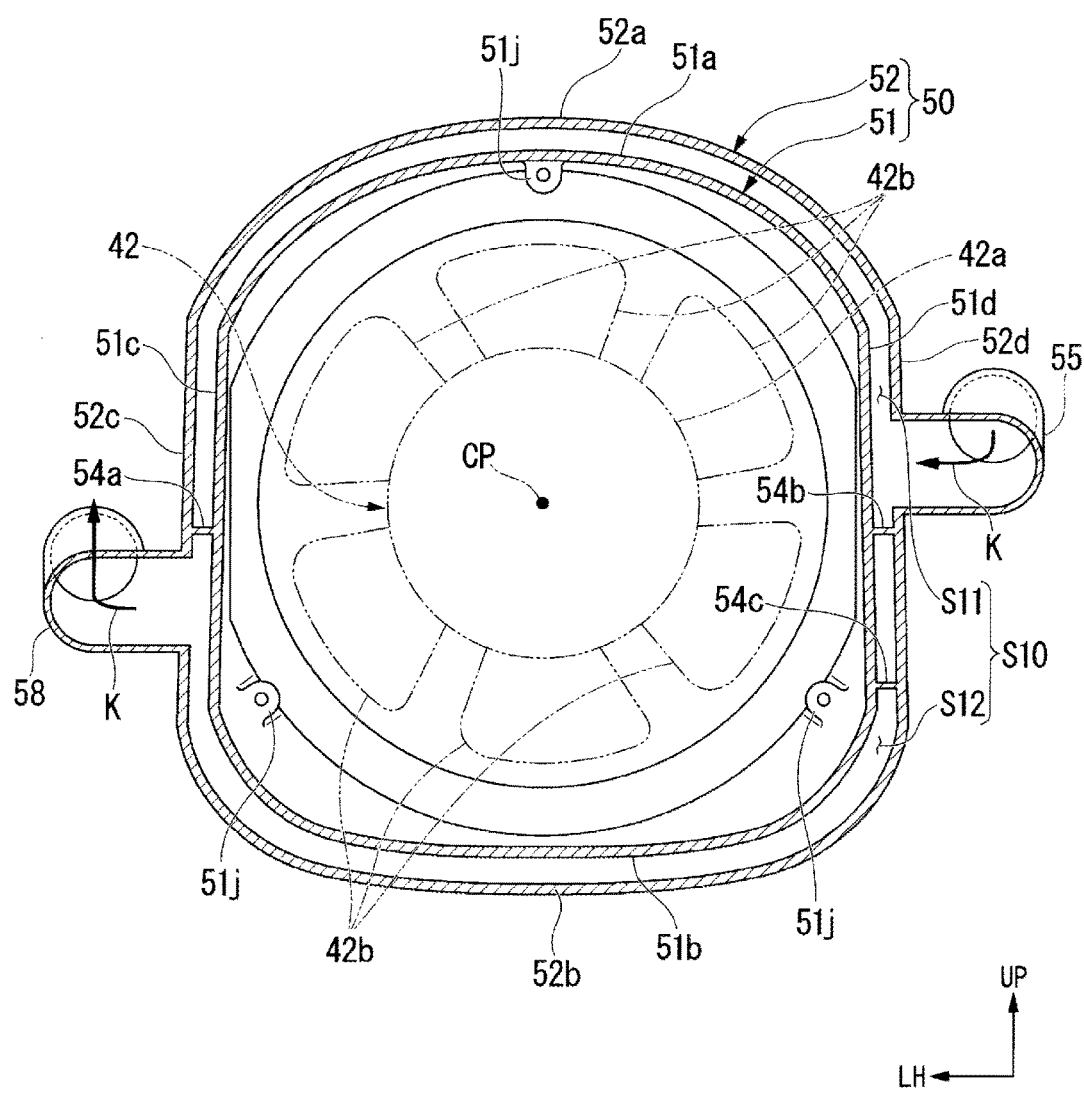
FIG. 7 is a diagram including a section along line VII-VII in FIG. 4.

Referring to FIGS. 5 to 7 in combination, the shroud 50 has a double structure having an internal space S10. The internal space S10 allows the cooling water to pass through the internal space S10 when the cooling water circulates in the water jacket (not shown) of the engine, the front radiator 20, the rear radiator 30, and the respective pipes provided among them.

The shroud 50 includes, as the double structure, an inner portion 51 having a tubular shape and an outer portion 52 that is provided outside the inner portion 51 in the radial direction and has a tubular shape. The internal space S10 is formed between the inner portion 51 and the outer portion 52.

In one example, the shroud 50 is formed of a metal such as aluminum. The shroud 50 can be formed by casting and welding. The internal space S10 can be formed by carrying out casting in a state in which one end part of the inner portion 51 and the outer portion 52 in the axis line direction is opened and then sealing the open part to make a hollow area between the inner portion 51 and the outer portion 52.

In the sectional view of FIG. 7, the inner portion 51 includes an inner upper wall 51a that curves to have an upward-convex shape (have a reverse U-shape), an inner lower wall 51b that curves to have a downward-convex shape (have a U-shape) with a smaller curvature than the inner upper wall 51a, and inner left and right walls 51c and 51d that extend in a straight line manner in the upward-downward direction and join the left and right end parts, respectively, of the inner upper and lower walls 51a and 51b.

In the sectional view of FIG. 7, on the inner wall of the inner portion 51, plural (for example, three, in the present embodiment) boss parts 51j that protrude inward in the radial direction from the inner wall of the inner portion 51 are provided. In FIG. 7, the plural boss parts 51j are disposed at predetermined intervals in the circumferential direction (for example, intervals of approximately 120° around the center CP, in the present embodiment). To each boss part 51j, the joining wall 47 of the casing 44 (see FIG. 2) is fastened and fixed by a fastening member such as a bolt.

In the sectional view of FIG. 5, the inner upper wall 51a extends with a slight inclination in such a manner that a part closer to the rear side is located closer to the upper side, and the inner lower wall 51b extends substantially in the front-rear direction. The inner upper wall 51a has a longer front-rear length than the inner lower wall 51b.

In the sectional view of FIG. 6, the inner left and right walls 51c and 51d extend with an inclination in such a manner that a part closer to the rear side is located closer to the outside in the vehicle width direction. Due to this, an air guiding space A10 to which cooling air is guided becomes wider as the position gets closer to the rear side.

Referring to FIGS. 4 to 6 in combination, radiating fins 53 that release heat of the cooling water that has passed through the internal space S10 are provided on the surface facing the air guiding space A10 in the inner portion 51 (surface facing the air guiding space A10 in the shroud 50). The radiating fins 53 protrude inward in the radial direction from the surface facing the air guiding space A10 in the inner portion 51 and are plurally provided to have a straight line shape in such a manner as to flare from the side of the fan 40 toward the side of the rear radiator 30.

This allows the cooling air to be guided along the plural radiating fins 53 even in the case in which the flow of the cooling air is likely to become unstable due to that the air guiding space A10 becomes wider as the position gets closer to the rear side. Thus, the flow of the cooling air can be inhibited from becoming unstable and the air guiding function of the cooling air can be kept.

The front end parts of the plural radiating fins 53 are separate from the front end of the inner portion 51 by a predetermined distance (for example, distance equivalent to the tube diameter of a first cooling water passing part 55 and a fourth cooling water passing part 58 to be described later), and the rear end parts of the plural radiating fins 53 are close to the rear end of the inner portion 51 (core 31).

Referring to FIG. 6, seven radiating fins 53 are provided on the inner upper wall 51a. Referring to FIGS. 4 and 5, ten radiating fins 53 are provided on each of the inner left and right walls 51c and 51d. The numbers of radiating fins 53 provided on the respective walls of the inner portion 51 are not limited thereto.

In FIG. 7, the outer portion 52 includes the following walls: an outer upper wall 52a that is disposed outside the inner upper wall 51a in the radial direction and curves to have an upward-convex shape (have a reverse U-shape); an outer lower wall 52b that is disposed outside the inner lower wall 51b in the radial direction and curves to have a downward-convex shape (have a U-shape) with a smaller curvature than the outer upper wall 52a; and outer left and right walls 52c and 52d that are disposed outside the inner left and right walls 51c and 51d, respectively, in the radial direction and extend in a straight line manner in the upward-downward direction to join the left and right end parts, respectively, of the outer upper and lower walls 52a and 52b.

The shroud 50 has plural (for example, three, in the present embodiment) partition walls 54a, 54b, and 54c (first partition wall 54a, second partition wall 54b, and third partition wall 54c) that divide the internal space S10 into the first internal space S11 and the second internal space S12, which will be described later.

In FIG. 7, the respective partition walls 54a, 54b, and 54c are provided between the inner left and right walls 51c and 51d and the outer left and right walls 52c and 52d.

The respective partition walls 54a, 54b, and 54c can also be referred to as "partition wall parts."

The first partition wall 54a is disposed between the inner left wall 51c and the outer left wall 52c. The second partition wall 54b and the third partition wall 54c are disposed between the inner right wall 51d and the outer right wall 52d separately from each other in the upward-downward direction.

In FIG. 5, the outer upper wall 52a extends along the inner upper wall 51a with a slight inclination in such a manner that a part closer to the rear side is located closer to the upper side. The outer lower wall 52b extends along the inner lower wall 51b substantially in the front-rear direction. The outer upper wall 52a has a longer front-rear length than the outer lower wall 52b.

In FIG. 6, the outer left and right walls 52c and 52d extend along the inner left and right walls 51c and 51d with an inclination in such a manner that a part closer to the rear side is located closer to the outside in the vehicle width direction.

The respective walls of the outer portion 52 are opposed to the respective walls of the inner portion with the intermediary of a substantially equal interval and the area between them serves as the internal space S10.

Referring to FIGS. 2 to 4 in combination, plural (for example, two for each of the right and left, i.e. four in total) bracket support portions 59 are provided on the outer left and right walls 52c and 52d. In the side view of FIG. 4, the respective bracket support portions 59 on the left and right have a rectangular shape along the long sides of the rear radiator 30 and are separated from each other in the direction along the long sides.

Referring to FIGS. 2 to 4 in combination, a bracket 28 is attached to each bracket support portion 59.

In side view of FIG. 4, the brackets 28 each include the following parts: a bracket main body 28a that has a rectangular shape along the longitudinal direction of the left and right plates 36 and 37 of the rear radiator 30 and is fixed to the left or right plate 36 or 37; a front extending part 28b that bends and extends from the front long side part of the bracket main body 28a toward the upper front side and is attached to the bracket support portion 59; and a rear extending part 28c that bends and extends from the rear long side part of the bracket main body 28a toward the lower rear side and is attached to the support member 29 (see FIG. 1).

Referring to FIGS. 2 and 3 in combination, the internal space S10 is divided into the first internal space S11 through which the cooling water is caused to pass and the second internal space S12 through which the cooling water that has passed through the first internal space S11 is caused to pass. The internal space S10 is divided into upper and lower spaces and the second internal space S12 is disposed under the first internal space S11.

In FIG. 7, the first partition wall 54a and the second partition wall 54b mark out the first internal space S11 at the upper part of the shroud 50.

In FIG. 7, the first partition wall 54a and the third partition wall 54c mark out the second internal space S12 at the lower part of the shroud 50.

Specifically, the cooling water that has passed through the rear radiator 30 after passing through the first internal space S11 is caused to pass through the second internal space S12. As above, the cooling system 100 is configured to cause the cooling water to flow in order of the first internal space S11, the rear radiator 30, and the second internal space S12.

Referring to FIGS. 2 to 4 in combination, the outer portion 52 is provided with plural (for example, four) cooling water passing parts 55, 56, 57, and 58 (first cooling water passing part 55, second cooling water passing part 56, third cooling water passing part 57, and fourth cooling water passing part 58).

The first cooling water passing part 55 is provided on the outer right wall 52d.

The second cooling water passing part 56 is provided on the outer upper wall 52a.

The third cooling water passing part 57 is provided on the outer lower wall 52b.

The fourth cooling water passing part 58 is provided on the outer left wall 52c.

In FIG. 6, the first cooling water passing part 55 has a tubular shape that protrudes from the front part of the outer right wall 52d toward the right side and then extends forward. To the front end part of the first cooling water passing part 55, the rear end part of a fourth pipe 64 that extends rearward from the left side end part of the front radiator 20 is joined. The first cooling water passing part 55 causes the cooling water from the front radiator 20 to flow into the first internal space S11 via the fourth pipe 64.

In FIG. 5, the second cooling water passing part 56 includes an upstream passage 56a that forms a flow path 56s of the cooling water with a tubular shape that protrudes from the left end part of the outer upper wall 52a toward the upper rear side and faces the inlet part 34a of the upper tank 34, and an upper flange portion 56b that extends from the rear end part of the upstream passage 56a toward the upper and lower sides and the outside in the vehicle width direction.

The upper flange portion 56b is fastened and fixed to the left end part of the front side of the upper tank 34 (inlet-part forming part 34b) by bolts or the like. The upstream passage 56a of the second cooling water passing part 56 causes the cooling water from the first internal space S11 to flow out to the inlet part 34a of the upper tank 34.

In FIG. 5, the third cooling water passing part includes a downstream passage 57a that forms a flow path 57s of the cooling water with a tubular shape that protrudes from the right end part of the outer lower wall 52b toward the lower rear side and faces the outlet part 35a of the lower tank 35, and a lower flange portion 57b that extends from the rear end part of the downstream passage 57a toward the upper and lower sides and the outside in the vehicle width direction. The lower flange portion 57b is fastened and fixed to the right end part of the front side of the lower tank 35 (outlet-part forming part 35b) by bolts or the like. The downstream passage 57a of the third cooling water passing part 57 causes the cooling water from the outlet part 35a of the lower tank 35 to flow into the second internal space S12.

In FIG. 6, the fourth cooling water passing part 58 has a tubular shape that protrudes from the front part of the outer left wall 52c toward the left side and then extends forward. To the front end part of the fourth cooling water passing part 58, the rear end part of a fifth pipe 65 that extends rearward from the water pump on the front side is connected. The fourth cooling water passing part 58 causes the cooling water from the second internal space S12 to flow out to the water pump via the fifth pipe 65.

As viewed along the axis line direction of FIG. 3, the first cooling water passing part 55 is disposed close to the second partition wall 54b at the front part of the outer right wall 52d. This can ensure a long flow path as the flow path from the first cooling water passing part 55 to the second cooling water passing part in the first internal space S11. Thus, the first internal space S11 can be effectively utilized as a passing part (circulation part) of the cooling water.

As viewed along the axis line direction of FIG. 3, the fourth cooling water passing part 58 is disposed close to the first partition wall 54a at the front part of the outer left wall 52c. This can ensure a long flow path as the flow path from the third cooling water passing part 57 to the fourth cooling water passing part 58 in the second internal space S12. Thus, the second internal space S12 can be effectively utilized as a passing part (circulation part) of the cooling water.

The circulation route of the cooling water for cooling the engine will be described below.

Figure 8:
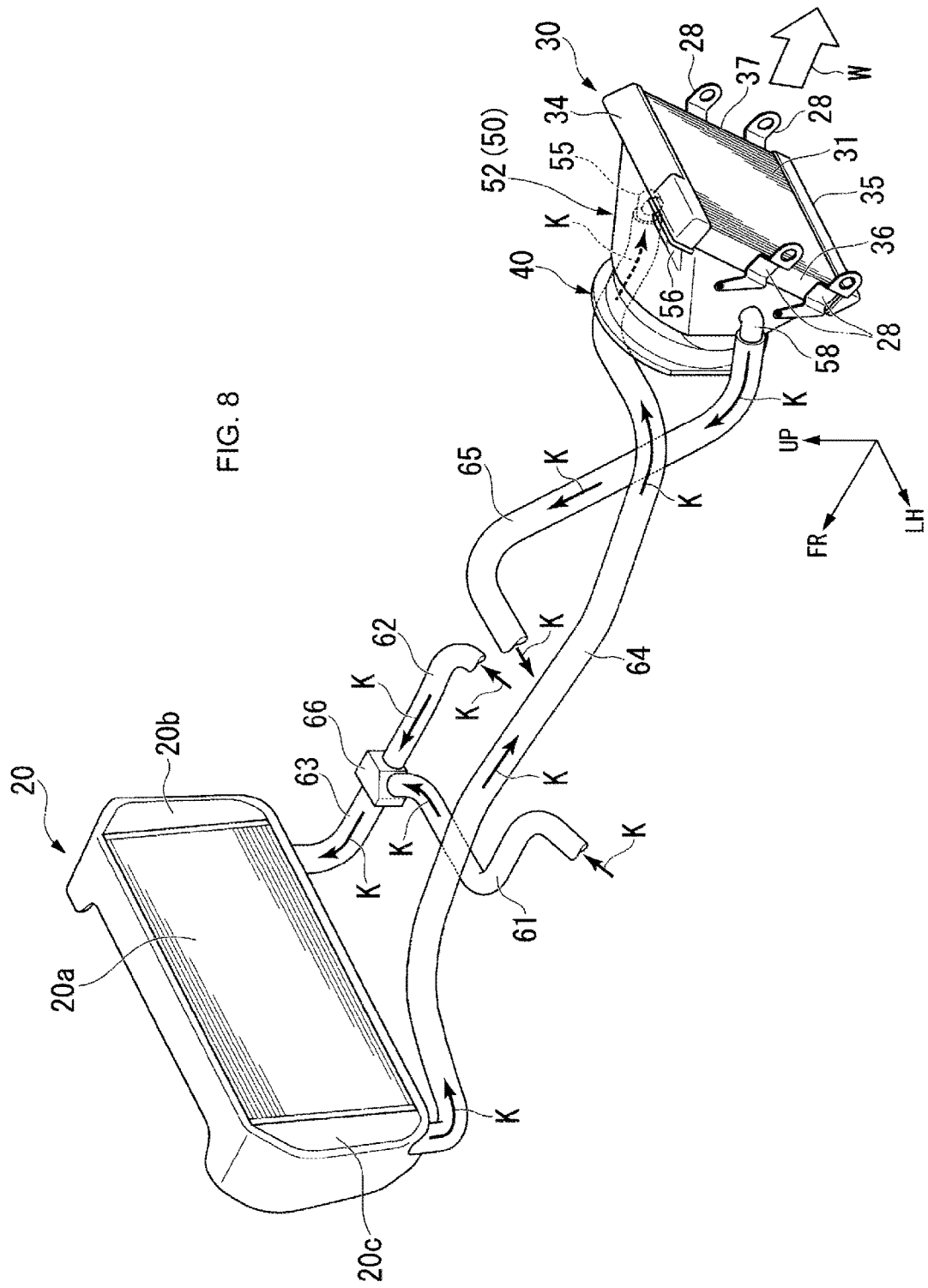
FIG. 8 is a diagram for explaining the flow of a cooling medium that flows between a front radiator and a rear radiator.

In FIG. 8, numerals 61, 62, 63, 64, and 65 denote a first pipe, a second pipe, a third pipe, the fourth pipe, and the fifth pipe, respectively. Furthermore, numeral 66 denotes a pipe joining portion that joins the first pipe 61, the second pipe 62, and the third pipe 63 in such a manner that these pipes communicate with each other.

The first pipe 61 extends with curving in the vehicle width direction, with one end part joined to the left side part of the water jacket (not shown) of the engine and with the other end part joined to the pipe joining portion 66.

The second pipe 62 extends with curving in the front-rear direction, with one end part joined to the right side part of the water jacket and with the other end part joined to the pipe joining portion 66.

The third pipe 63 extends with curving in the front-rear direction, with one end part (rear end part) joined to the pipe joining portion 66 and with the other end part (front end part) joined to the right end part of the front radiator 20 (for example, an inlet pipe of a right tank 20b). The third pipe 63 functions as a confluent pipe of the first pipe 61 and the second pipe 62.

The fourth pipe 64 extends with curving in the front-rear direction, with one end part (front end part) joined to the left side end part of the front radiator 20 (for example, an outlet pipe of a left tank 20c) and with the other end part (rear end part) joined to the front end part of the first cooling water passing part 55.

The fifth pipe 65 extends with bending in the front-rear direction, with one end part (rear end part) joined to the front end part of the fourth cooling water passing part 58 and with the other end part (front end part) joined to the water pump (not shown) on the front side.

The cooling water that has become hot due to the engine flows in the first pipe 61 and the second pipe 62 and converges to the third pipe 63. The cooling water that has converged to the third pipe 63 flows in the third pipe 63 and flows into the right tank 20b via the inlet pipe of the front radiator 20.

The cooling water that has flowed into the right tank 20b passes through tubes configuring a core 20a of the front radiator 20 and flows into the left tank 20c. The cooling water that has flowed into the left tank 20c flows into the fourth pipe 64 via the outlet pipe.

The cooling water that has flowed into the fourth pipe 64 flows in the fourth pipe 64 and flows into the first internal space S11 (see FIG. 2) via the first cooling water passing part 55.

Referring also to FIG. 2, the cooling water that has flowed into the first internal space S11 flows in the first internal space S11 and flows into the upper tank 34 via the upstream passage 56a of the second cooling water passing part 56 and the inlet part 34a of the upper tank 34.

The cooling water that has flowed into the upper tank 34 passes through the tubes configuring the core 31 of the rear radiator 30 and flows into the lower tank 35.

The cooling water that has flowed into the lower tank 35 flows into the second internal space S12 via the outlet part 35a of the lower tank 35 and the downstream passage 57a of the third cooling water passing part 57.

The cooling water that has flowed into the second internal space S12 flows in the second internal space S12 and flows into the fifth pipe 65 via the fourth cooling water passing part 58. The cooling water that has flowed into the fifth pipe 65 flows in the fifth pipe 65 and flows into the water pump of the engine. The cooling water that has flowed into the water pump is pressure-fed toward the water jacket of the engine.

Referring also to FIG. 8, the cooling water pressure-fed toward the water jacket circulates in the wafer jacket and absorbs heat of the engine, and thereafter flows into the first pipe 61 and the second pipe 62. In this manner, the cooling water that has become hot due to the engine circulates and flows in the water jacket, the front radiator 20, the rear radiator 30, and the respective pipes provided among them, thereby releasing heat.

As described above, in the above-described embodiment, in the cooling system 100 including the rear radiator 30 that is mounted in the vehicle 1 and circulates the cooling water to release heat of the cooling water, the fan 40 that generates the cooling air to cool the rear radiator 30, and the shroud 50 that is provided between the fan 40 and the rear radiator 30 and guides the cooling air, the shroud 50 has the double structure having the internal space S10 and the internal space S10 allows the cooling water to pass through the internal space S10 when the cooling water circulates.

According to this configuration, due to that the shroud 50 has the double structure having the internal space S10 and the internal space S10 allows the cooling water to pass through the internal space S10 when the cooling water circulates, the cooling water passing through the internal space S10 can be cooled by the cooling air at the surface of the shroud 50. Therefore, the shroud 50 can be allowed to have a cooling function and the cooling performance of the cooling water can be improved.

Furthermore, in the above-described embodiments, the internal space S10 is formed between the inner portion 51 and the outer portion 52. This allows the cooling water passing through the internal space S10 to be cooled by the cooling air at the surface facing the air guiding space A10 in the inner portion 51 (inner side surface in the radial direction). Therefore, with the simple structure including the inner portion 51 and the outer portion 52 as the double structure, the shroud 50 can be allowed to have the cooling function and the cooling performance of the cooling water can be improved.

Moreover, in the above-described embodiments, the shroud 50 includes the partition walls 54a, 54b, and 54c that divide the internal space S10 into the first internal space S11 through which the cooling water is caused to pass and the second internal space S12 through which the cooling water that has passed through the first internal space S11 is caused to pass. Due to this, the cooling water passing through the first internal space S11 can be cooled by the cooling air at the surface of the part forming the first internal space S11 of the shroud 50. In addition, the cooling water that has passed through the first internal space S11 can be further cooled by the cooling air at the surface of the part forming the second internal space S12 of the shroud 50. Therefore, the cooling water can be cooled at two stages and the cooling performance of the cooling water can be further improved.

In addition, in the above-described embodiments, the partition walls 54a, 54b, and 54c divide the internal space S10 into upper and lower spaces and the second internal space S12 is disposed under the first internal space S11. This allows the cooling water to flow from the first internal space S11 to the second internal space S12 by utilizing the gravitational force. Thus, the cooling water can be caused to efficiently flow from the first internal space S11 toward the second internal space S12.

Furthermore, in the above-described embodiments, the cooling system 100 is configured to cause the cooling water to flow in order of the first internal space S11, the rear radiator 30, and the second internal space S12. Due to this, the cooling water passing through the first internal space S11 can be cooled by the cooling air at the surface of the part forming the first internal space S11 of the shroud 50. In addition, the cooling water that has passed through the first internal space S11 can be further cooled by circulating the cooling water by the rear radiator 30. Then, the cooling water that has circulated in the rear radiator 30 can be further cooled by the cooling air at the surface of the part forming the second internal space S12 of the shroud 50. Therefore, the cooling water can be cooled at three stages and the cooling performance of the cooling water can be further improved.

Moreover, in the above-described embodiments, the radiating fin 53 that releases heat of the cooling water is provided on the surface facing the air guiding space A10 to which the cooling air is guided in the shroud 50. This increases the surface area of the surface facing the air guiding space A10 in the shroud 50 and thus can improve the heat release effect of the cooling water.

In addition, in the above-described embodiments, the rear radiator 30 is mounted in the motorcycle 1 and the front radiator 20 that circulates the cooling water common with the rear radiator 30 is provided at the vehicle front part. This can reduce the size of the front radiator 20 compared with the case in which only one radiator is provided. Thus, it becomes easy to make the vehicle front part compact, which allows improvement in the appearance.

Furthermore, in the above-described embodiments, the fan 40 is disposed on the upstream side relative to the rear radiator 30 in the flow of the cooling air. This allows the cooling water passing through the internal space S10 to be cooled by the cooling air before passing through the rear radiator 30 (before being warmed due to the passing through the rear radiator 30). Thus, the cooling performance of the cooling water can be further improved.

In the above-described embodiments, the cooling water is used as the cooling medium. However, the cooling medium is not limited thereto and a coolant comparable to the cooling water, such as an antifreeze liquid, may be used.

Furthermore, although only one shroud 50 is provided between the fan 40 and the rear radiator 30 in the above-described embodiment, the configuration is not limited thereto. For example, a pair of left and right plate-shaped shrouds may be provided between the fan 40 and the rear radiator 30 or a pair of upper and lower plate-shaped shrouds may be provided between the fan 40 and the rear radiator 30. In this case, the cooling water passing through the internal space S10 can be cooled by the cooling air at the surface facing the air guiding space A10 in the outer portion 52 (outer side surface in the radial direction).

Moreover, in the above-described embodiments, the internal space S10 is divided into two spaces, i.e. the first internal space S11 through which the cooling water is caused to pass and the second internal space S12 through which the cooling water that has passed through the first internal space S11 is caused to pass. However, the internal space S10 is not limited thereto and may be divided into three or more spaces.

In addition, although the internal space S10 is divided into upper and lower spaces in the above-described embodiment, the internal space S10 is not limited thereto and may be divided into left and right spaces.

Furthermore, in the above-described embodiments, the fan 40 is configured to send the cooling air toward the rear radiator 30. However, the configuration is not limited thereto and the fan 40 may be configured to draw the cooling air from the rear radiator 30. In other words, although the fan 40 is disposed on the upstream side relative to the rear radiator 30 in the flow of the cooling air, the configuration is not limited thereto and the fan 40 may be disposed on the downstream side relative to the rear radiator 30.

Moreover, although a down-flow type is used as the rear radiator 30 in the above-described embodiments, the rear radiator 30 is not limited thereto and a side-flow type may be used.

The present invention is not limited to the above-described embodiments. For example, the above-described saddle-type vehicles include overall vehicles a driver rides astride the vehicle body, and include not only motorcycles (including motorized bicycles and scooter-type vehicles) but also three-wheeled vehicles (including also vehicles with front two wheels and rear one wheel besides vehicles with front one wheel and rear two wheels).

Furthermore, the configuration in the above-described embodiments are examples of the present invention and it is possible to make various changes such as replacement of a constituent element of the embodiments by a well-known constituent element without departing from the gist of the present invention.

DESCRIPTION OF REFERENCE SYMBOLS

1 Motorcycle (vehicle, saddle-type vehicle)
20 Front radiator (second radiator)
30 Rear radiator (radiator)
40 Fan
50 Shroud
51 Inner portion
52 Outer portion
53 Radiating fin
54a, 54b, 54c Partition wall (partition wall part)
100 Cooling system
A10 Air guiding space
S10 Internal space
S11 First internal space
S12 Second internal space

The invention claimed is:

1. A cooling system, comprising:
a radiator that is mounted in a vehicle and circulates a cooling medium to release heat of the cooling medium;
a fan configured to generate cooling air to cool the radiator; and
a shroud that is provided between the fan and the radiator and is configured to guide the cooling air,
wherein the shroud comprises a double structure having an internal space,
wherein the internal space is configured to enable the cooling medium to pass through the internal space when the cooling medium circulates,
wherein the radiator is mounted in a saddle-type vehicle as the vehicle, and
wherein an additional radiator configured to circulate the cooling medium common with the radiator is provided at a front part of the vehicle.

2. The cooling system according to claim 1, wherein the shroud includes, as the double structure:
an inner portion having a tubular shape; and
an outer portion that is provided outside the inner portion in a radial direction and has a tubular shape,
wherein the internal space is formed between the inner portion and the outer portion.

3. The cooling system according to claim 1,
wherein the shroud includes partition wall parts that divide the internal space into a first internal space through which the cooling medium is configured to pass, and
a second internal space through which the cooling medium that has passed through the first internal space is configured to pass.

4. The cooling system according to claim 3, wherein:
the partition wall parts divide the internal space into upper and lower spaces, and
wherein the second internal space is disposed under the first internal space.

5. The cooling system according to claim 3,
wherein the cooling system is configured to cause the cooling medium to flow in order of the first internal space, the radiator, and the second internal space.

6. The cooling system according to claim 1,
wherein a radiating fin that is configured to release the heat of the cooling medium is provided on a surface facing an air guiding space to which the cooling air is guided in the shroud.

7. The cooling system according to claim 1,
wherein the fan is disposed on an upstream side relative to the radiator in a flow direction of the cooling air.

8. A cooling system, comprising:
radiator means for circulating a cooling medium to release heat of the cooling medium, said radiator means being mounted in a vehicle;
air circulation means for circulating cooling air for cooling the radiator means;
shroud means disposed between the air circulation means and the radiator means, said shroud means for guiding the cooling air; and
radiating fin means for releasing the heat of the cooling medium, said radiating fin means provided on a surface facing an air guiding space to which the cooling air is guided in the shroud means,
wherein the shroud means includes double structure means for providing an internal space therein, and wherein the internal space enables the cooling medium to pass through the internal space when the cooling medium circulates.

9. The cooling system according to claim 8, wherein the shroud means includes, as the double structure means, an inner portion having a tubular shape, and an outer portion disposed outside the inner portion in a radial direction and having a tubular shape,
wherein the internal space is disposed between the inner portion and the outer portion.

10. The cooling system according to claim 8, wherein the shroud means includes partition wall means for dividing the internal space into a first internal space through which the cooling medium is configured to pass, and a second internal space through which the cooling medium that has passed through the first internal space is configured to pass.

11. The cooling system according to claim 10, wherein the partition wall means is for dividing the internal space into upper and lower spaces, and wherein the second internal space is disposed under the first internal space.

12. The cooling system according to claim 10, wherein the cooling system is configured to cause the cooling medium to flow in order of the first internal space, the radiator means, and the second internal space.

13. The cooling system according to claim 8, wherein the air circulating means is disposed on an upstream side relative to the radiator means in a flow direction of the cooling air.

14. A cooling system, comprising:
radiator means for circulating a cooling medium to release heat of the cooling medium, said radiator means being mounted in a vehicle;
air circulation means for circulating cooling air for cooling the radiator means; and
shroud means disposed between the air circulation means and the radiator means, said shroud means for guiding the cooling air,
wherein the shroud means includes double structure means for providing an internal space therein, and wherein the internal space enables the cooling medium to pass through the internal space when the cooling medium circulates, and
wherein the radiator means is mounted in a saddle-type vehicle as the vehicle, and wherein the cooling system further comprises additional radiator means for circulating the cooling medium common with the radiator means, said additional radiator means being disposed at a front part of the vehicle.

* * * * *